Patented Oct. 19, 1943

2,332,128

UNITED STATES PATENT OFFICE 2,332,128

PROCESS OF AND COMPOSITION FOR TREATING FRESH FRUIT

Irvin John Blondon, Pomona, Calif., assignor, by mesne assignments, to Brogdex Company, a corporation of California No Drawing. Application July 24, 1940, Serial No. 347,275

17 Claims. (Cl. 99—103)

This invention relates to processes of and compositions for treating fresh fruit. More particularly it relates to the surface treatment of fruit for the purpose of permanently depositing thereon surface-modifying materials that are substantially water-insoluble, but are oil-soluble, or at least oil-compatible, such as wax or wax-like materials and oil-soluble dyes, for example; said surface-modifying materials being applied to the whole fresh fruit in the form of an aqueous emulsion which includes a soapy emulsifying agent, and the aqueous component of which is largely a naturally hard water containing calcium and magnesium salts, for example, together with an alkali-metal hexametaphosphate added in sufficient proportion to prevent decomposition of the emulsifying agent and render the emulsion stable.

As is well known, it has long been a practice, in preparing fresh citrus and other fruits and vegetables for market, to surface-treat such fruits and vegetables with aqueous emulsions of waxy protective material to diminish the normal rate of withering or shriveling, and often also with aqueous emulsions of various oil-soluble colors or dyestuffs for the purpose of correcting deficiencies of coloration normal to ripe fruit, in order that it may not be penalized in the market for unattractive appearance. In order to treat fruit satisfactorily with such emulsions, it is important to control rather closely the operating conditions with respect especially to the pH and surface tension of the emulsion, and also to avoid the presence in the emulsion of substances, either dissolved or suspended, tending to cause the emulsion to "break," or otherwise adversely to affect its character. Where the water available for preparing the emulsions has a substantial degree of hardness, because of its content of calcium and magnesium salts, special precautions have to be taken and the problem of satisfactorily controlling the operating conditions is seriously complicated. The hardening constituents of the water react with the fatty acid components of the soap emulsifying agent, with formation of relatively insoluble soaps of calcium and magnesium which precipitate or separate out, thus depleting the supply of soap-emulsifying agent, with the result that, unless a sufficient excess of soap is employed, the emulsion breaks and becomes useless for fruit-treating purposes.

In order to overcome this difficulty in the case of emulsion baths for dyeing or coloring fruit to enhance its natural varietal color, it has been proposed heretofore to soften the hard water, prior to utilizing it for preparation of the dyestuff emulsion, by treating it in the usual manner with lime and soda, or in a water softener of the well known "Permutit" type. This is of course entirely possible from an academic standpoint; but when it is considered that any commercially feasible treatment of fresh fruit with an emulsion must be low in cost, it is apparent that such proposed special preparatory treatment of the hard water, whereby its hardening constituents are removed prior to use, is often prohibitively expensive. Moreover, where water that is especially hard is softened by such preparatory treatment, the relatively large proportion of sodium salts thus substituted for the calcium and magnesium salts is undesirable in both dye and wax emulsions for treating fruit, because of its tendency to reduce the gloss or shine of the treated fruit surface.

In the case of wax emulsions employed for protectively coating fresh fruit, there seems to have been no proposal for overcoming the difficulty due to hard water except to use an excess of soap. But this is objectionable for various reasons, among which are undesirable increase in viscosity of the liquid emulsion and tendency to foam excessively. Rather than suffer these disadvantages, it has even been proposed (U. S. Patent to Tisdale, No. 2,128,973) to do away with the use of wax and to substitute therefor an emulsion of a so-called miscible rosin rendered stable by the use of wetting or dispersing agents consisting of the sulphates of high-molecular fatty alcohols, in conjunction with other addition agents, whereby the emulsion is said to be rendered stable against the hardening components of the water. But this fails to solve the problem, since wax or wax-like material is universally recognized as far superior to any known type of rosin material as protective coating for fresh fruit.

It should be stated here that the difficulty in respect to using hard waters for preparing treating emulsions of the general character aforesaid is encountered chiefly when diluting the initially prepared and usually highly concentrated emulsion to the relatively low concentrations at which such emulsions are actually applied to the fruit as it goes through the packing house in the locality where the fruit is produced. It is of course frequently practical to avoid the hard water difficulty in manufacturing the emulsion concentrate itself, either by employing water that is naturally soft or by a preparatory softening treatment. But since the emulsion concentrates are often diluted at the place of use with as much as 4 to 10 volumes of water which, in practice, must be taken from whatever supply is locally available at the packing house, such special preparatory treatment of the very much larger volume of dilution water is ordinarily too inconvenient or too costly, as pointed out above.

Some postponement of the inevitable breakdown of a treating emulsion of this kind, made up with naturally hard water, is attainable by first softening the water with trisodium phosphate for example, before adding the stock emulsion concentrate thereto. The trisodium phosphate precipitates out the calcium and magnesium as relatively insoluble phosphates, which are allowed to remain in suspension. Then, when the concentrated emulsion is added, all of the soap employed as an emulsifying agent for the waxy material or for the oil-soluble dye, as the case may be, remains intact and functions effectively for a time. However, calcium and magnesium soaps are more insoluble than the phosphates of calcium and magnesium, and the latter therefore slowly dissolve, with resultant precipitation eventually of the corresponding calcium and magnesium soaps. Thus, although the use of trisodium phosphate prevents such emulsions from breaking down as quickly as they would under ordinary circumstances when diluted with hard waters, this beneficial effect is only temporary. The breakdown of the emulsion is also hastened by the tendency of the precipitate of calcium and magnesium phosphates to coagulate the waxes (and oils, when used) present in the emulsion. A further disadvantage in using trisodium phosphate or similar compounds in this way is that both the pH and the surface tension of the emulsion are thereby raised. This is undesirable because the lower the surface tension of the emulsion, the better is the coverage obtained in treating fruits therewith.

It has now been found that the above mentioned difficulties incident to the use of hard waters in preparing and using treating emulsions of the character described, can be overcome in an exceedingly simple and economical manner by the employment of an alkali-metal hexametaphosphate as the water softening agent present in the water for diluting the emulsion concentrate and in the resultant diluted emulsion as applied to the fruit. The use of hexametaphosphates for general water-softening purposes has been proposed heretofore, but the fact that they afford marked and surprising advantages when employed in fruit-treating emulsions of water-insoluble surface-modifying materials, such as waxes and oil-soluble dyestuffs, has never before been appreciated or suggested so far as this applicant is aware. Besides preventing the calcium and magnesium content of the water from reacting with the soap or soaps employed as an emulsifying agent for the wax or dyestuff to form insoluble calcium and magnesium soaps, without raising the pH of the emulsion, the addition of hexametaphosphate has the further surprising effect of causing a very marked reduction in the surface tension of the emulsion after it has been in use for a time, the emulsion thus not only remaining, for long periods of time, free of suspended insoluble compounds of calcium and magnesium and entirely stable, but also becoming increasingly effective in its power to thoroughly wet and cover the fruit to be treated, because of the lowering of its surface tension with aging.

Through this discovery, it thus becomes possible to depart from the customary practice of using an excess of soap or soapy emulsifying agent in fruit treating emulsions of the character in question. Not only does this enable economy in the use of soap, but it also has further marked advantages peculiar to the respective specific types of emulsions whose composition and use embody the principles of the invention.

Thus, after an orange, for example, has been immersed in a wax-containing emulsion prepared in accordance with the invention, and the excess emulsion has been allowed to drain therefrom, the residual emulsion on the surface of the orange dries down much more quickly to a nontacky film-like protective coating than where, in accordance with the former practice, a substantial excess of soap was employed in the emulsion to keep it from breaking. In that former practice, the emulsion remaining on the fruit after immersion was sticky and hard to dry because of the excess soap present. Not only does fruit to which a wax emulsion of the present invention has been applied dry more quickly, but the resultant final dry film coating has a materially better luster or shine than where, as under former practice, the emulsion carried, suspended therein, insoluble calcium and magnesium soaps which frequently caused the nominally "dry" film coating to be dull and sticky. This advantage is of particularly great importance when employing emulsions of the so-called "dry bright" type, which are commonly characterized by the inclusion of a relatively hard wax, such as carnauba, in the wax content of the emulsion, for the purpose of obtaining a finished film coating that will have a comparatively high luster or polish simply upon drying, without the necessity of rubbing or brushing the fruit on brush rolls.

Where the principles of the invention are applied in connection with treating fresh fruit, such as oranges, for example, to enhance the color thereof by application thereto of an emulsion containing a suitable dyestuff or color, marked advantages also result. Freedom of the emulsion dye bath from suspended calcium and magnesium soaps makes it possible to obtain substantially more uniform or level dyeing of the skin of the fruit to the desired tint, in contrast to the blotchy and irregular dyeing effects frequently characterizing prior practice. There is also considerable economy of dyestuff, substantial quantities of which were formerly lost through adsorption by the calcium and magnesium precipitates.

Sodium hexametaphosphate in the form commercially available is eminently well suited for use in practicing the invention. The commercial product at present available analyzes about 90 per cent hexametaphosphate, the remaining 10 per cent consisting mainly of sodium pyrophosphate. The pyrophosphate is not an objectionable component, since it acts to some extent like the hexametaphosphate, although far less efficiently. A solution of such commercial sodium hexametaphosphate, although nearly neutral, is slightly on the acid side. Therefore, since it is necessary in the practice of the invention to avoid development of acidity sufficient to cause a breakdown of the emulsion due to liberation of the fatty acids from the soapy emulsifying agent present, it is advisable to include in the emulsion a sufficient quantity of a water-soluble alkaline agent to keep it slightly on the alkaline side, a pH range of 7 to 9 being typically satisfactory, and pH 8.0 to 8.5 being usually about optimum. In order to maintain the proper degree of slight alkalinity and ensure adequate buffering, the use of salts whose solution in water are moderately basic or alkaline is especially advantageous. Trisodium phosphate and sodium pyrophosphate, for example, are suitable for this purpose, as are also sodium carbonate and bicarbonate, and borax.

In applying the invention to the protective coating of fresh fruits such as oranges, lemons, tomatoes, nectarines, etc., by means of waxy material, a concentrated stock emulsion of the "dry bright" type may be made up according to the following formula, the percentages indicated being by weight:

| | Per cent |
|---|---|
| Carnauba | 18 |
| Paraffin | 6 |
| Oleic acid | 9 |
| Triethanolamine | 6 |
| Water | 61 |

In preparing an emulsion in accordance with the above formula, the carnauba wax, paraffin wax and oleic acid are melted together and the molten mixture is brought to a temperature of approximately 95° C. The triethanolamine is then added and stirred in carefully until the reaction between it and the oleic acid to form the emulsifying soap is completed. The water, also heated to approximately 95° C. is then added gradually in small quantities, each addition being stirred in thoroughly before adding another portion. A clear, jelly-like emulsion or colloidal solution is obtained after about 10% of the water has been added. As further water is added, the solution becomes less viscous, and the remaining water may be added more rapidly. At this concentration, approximating 24% for the combined waxy components (carnauba and paraffin), the emulsion thus prepared may be stored for long periods of time before use.

Usually it is better not to add hexametaphosphate to the water used in preparing this concentrated stock emulsion, although it is of course permissible to do so within the scope of the invention. However, since it is often necessary in commercial practice to store the concentrated emulsion for relatively long periods of time, in some instances for several months, and since more or less decomposition or reversion of the hexametaphosphate into less effective phosphate compounds is found to occur during such long storage periods, adding hexametaphosphate at this stage is apt to result in appreciable loss. Sodium hexametaphosphate being relatively expensive, such loss is highly uneconomical. Moreover, it need not be incurred because, even though the water used in making up the concentrated emulsion be relatively hard, there is comparatively little tendency for the emulsion to break down at this high concentration.

When it is to be used in accordance with the invention to protectively treat fresh fruit, the concentrated stock wax emulsion is diluted with water to the much lower concentration proper for application to the particular fruit in question, ordinarily to within a range of 2% to 6% depending upon the kind of fruit to be treated and the degree of protection desired, around 4% being a typical concentration as hereinabove indicated. To the diluting water is added a sufficient proportion of sodium hexametaphosphate, which will of course depend upon the degree of hardness of the water, to prevent precipitation of calcium and magnesium soaps and the resultant deterioration and breakdown of the emulsion; such addition of supplemental soluble basic and buffering material as may be necessary to adjust and control the pH of the emulsion within the desired range, as above explained, being also made at this time. The final wax emulsion bath may be employed at ordinary room temperature, or slightly warmed.

In typical instances, the proportion of commercial sodium hexametaphosphate used may be on the order of 1 to 2.5 pounds for each 50 gallons of diluting water. This is good practice where the emulsion is to be used over and over again to treat successive batches of fruit, either in a re-circulating spray system or in the ordinary dipping tank procedure, both of which are well known in the art and therefore require no specific description here. Using as much as 2.5 pounds of hexametaphosphate per 50 gallons of diluting water is often to be recommended because, where the same emulsion is thus used repeatedly for treating successive batches of fruit which may have been preliminarily washed and cleansed with relatively hard water before advancing into the emulsion-applicator, considerable calcium and magnesium salts are naturally being introduced continually into the emulsion with the water clinging to the wet fruit as it comes from the washer. Where the emulsion is to be used only once, as in a type of spray applicator where the emulsion is not re-circulated, a smaller proportion of sodium hexametaphosphate may be used such, for example, as 0.5 to 1.0 pound per 50 gallons, in typical instances.

Although a concentrated emulsion properly prepared as hereinabove described will remain stable over long periods of time, even though rather hard water may be used in preparing it, some slight precipitation of calcium and magnesium soaps is sometimes found to have occurred after long storage periods. The present invention obviates any difficulty that might otherwise arise on this score, however, because upon diluting such a concentrated emulsion with water to which an adequate proportion of sodium hexametaphosphate has been added, any such precipitate of calcium and magnesium soaps as may have been formed in the concentrated emulsion, under the circumstances above assumed, is promptly dissolved, so that the resultant diluted emulsion is clear.

Instead of making up a concentrated stock emulsion and then diluting it to operating concentration, as in the foregoing specific example, direct preparation of an emulsion of relatively low concentration is entirely feasible and in some cases advantageous. A useful typical formula in this connection is as follows:

| | Per cent |
|---|---|
| Paraffin | 3.4 |
| Refined non-volatile mineral oil | 0.6 |
| Borax | 1.0 |
| Oleic acid | 1.5 |
| Water | 93.5 |

The refined non-volatile mineral oil used in the above formula may desirably be of the type known as white mineral oil, but of fairly low viscosity. An excellent oil of this type that is commercially available and is substantially colorless, tasteless and odorless, has approximately the following physical characteristics; specific gravity 0.840, viscosity 70–73 seconds Saybolt at 100° F., flash point 340°–350° F., boiling range 600°–745° F.

Although inclusion of such an oil in a fruit-treating emulsion is of great advantage for certain purposes, the emulsion is not of the "dry-bright" type.

In preparing this emulsion, the borax is dissolved in water, together with the necessary proportion of sodium hexametaphosphate to take care of the hardening components of the water, and the solution is heated to a temperature approximating 95° C., run into an agitating tank and agitation started. The paraffin, white mineral oil and oleic acid are separately heated together to form a fluid mixture which is also brought to a temperature approximating 95° C., and this mixture is gradually run into the hot solution of borax and sodium hexametaphosphate, with continued agitation. After the agitation has been continued for five to fifteen minutes, emulsification is most desirably further perfected by running the mixture through a colloid mill, whereupon the emulsion is ready for application to the fruit.

Still another excellent emulsion formula for use in practicing the invention is as follows:

|  | Per cent |
|---|---|
| Carnauba | 3.0 |
| Paraffin | 1.0 |
| Triethanolamine | 1.0 |
| Oleic acid | 1.5 |
| Water | 93.5 |

This emulsion is of the "dry-bright" type. The above formula represents, of course, the final operating concentration, that is, the concentration at which the emulsion is actually applied to the fruit, in this instance 4%, figuring the carnauba and paraffin wax content together. It will be noted that this formula does not include the non-volatile mineral oil component specified in the formula next preceding, inclusion of such a non-volatile oil component being ordinarily undesirable in an emulsion of the dry-bright type. It is of course to be understood that the emulsion may be made up in concentrated form initially, without addition of hexametaphosphate at the time, this addition being subsequently made when the stock solution is diluted to operating concentration. But where the emulsion is made up directly at the final operating concentration, 4% in this instance, the hexametaphosphate is of course added to the make-up water at the time.

Where a given body of wax emulsion is used in a dipping tank or in a re-circulating spray applicator, to treat fruit coming directly from a washer, it is often desirable in practice to add further quantities of sodium hexametaphosphate from time to time, for example, on the order of about one-half pound for every 400 standard boxes of oranges (e. g.) run; or, say, about 1 pound daily for each 200 gallons of emulsion under normal operating conditions. This is desirable in order to take care of the additional calcium and magnesium salts that are brought into the emulsion bath by the fruit constantly coming from the washer. Also, in order to make up for the depletion of the emulsion due to drag-out or the quantity being continually carried off by the treated fruit leaving the emulsion applicator, occasional additions of emulsion are of course necessary to keep the concentration of coating materials reasonably constant and thereby ensure reasonable uniformity in the resultant protective coating of the fruit. It is to be understood, of course, that further additions of a basic salt, such as trisodium phosphate, may also be made from time to time as may be required to maintain the pH of the bath approximately at the desired point on the alkaline side, at 8.0, for example.

The application of the invention to the coloring of fruit by means of dye emulsions made up with naturally hard water is similar in principle to its above described application in connection with wax emulsions. There are numerous prior patents disclosing such coloring of fruit, particularly oranges, by means of aqueous emulsions of various dyestuffs or coloring materials that are approved or certified for use in connection with foods; and it is only necessary, in practicing the present invention, to employ sodium hexametaphosphate or other alkali-metal hexametaphosphate in sufficient proportion to prevent the breakdown or other objectional performance of the emulsion due to interaction between the hardening components of the water phase and the soap employed for emulsifying the oil-soluble dyestuff or color.

In a typical desirable embodiment of the invention, the dye bath is prepared as follows: A concentrated stock emulsion or colloidal solution of an oil-soluble dye, such as benzene-azo-beta-naphthylamine for example, is prepared by adding 1 part of the dye to a mixture consisting of 20 parts of 75% sulphonated castor oil and 20 parts of water, all parts being by weight, and thoroughly mixing the ingredients, the pH of the mixture being adjusted to about 8.5 by addition of an alkali metal hydroxide or a suitable basic salt. The resultant emulsion or colloidal solution is diluted, for use, with a sufficient quantity of a naturally hard water to give a final dye bath in which the concentration of the dye itself is about 0.03% to 0.06%. The diluting water should contain, say, about 1 pound of sodium hexametaphosphate for each 50 gallons, and enough soda ash is added to the dye bath to maintain it at a pH approximating 8.5, the unsulphonated portion of the castor oil being saponified to some extent by the action of the soda ash, thus providing soap for the emulsification of the dyestuff. A further quantity of any suitable soap may be added, if desired, to assist in the emulsification. Oranges passed through this bath, which is desirably heated moderately, say to around 120° to 135° F., are colored in a highly satisfactory manner and with notable economy of dyestuff. In order to maintain the proper concentration of sodium hexametaphosphate, an addition of about 1 pound daily per 300 gallons of dye bath, in normal use of such a bath, is typical good practice.

Although the particular form and manner in which the alkali-metal phosphate, as well as the pH-adjusting and buffering alkaline addition agents, are used may vary widely in actual practice of the invention, it has been found exceedingly convenient to employ them in a concentrated mixed stock solution in which the ingredients are accurately proportioned. For example, a 30% solution of commercial sodium hexametaphosphate may be prepared, by which is here meant a solution obtained by dissolving 30 parts by weight of hexametaphosphate in 100 parts by weight of water. Such a solution generally has a pH of between 5.8 and 6.2, with occasionally some slight variation beyond these limits depending upon the purity of the hexametaphosphate used. However, if this solution is made up to contain also 10% (i. e. 10 parts by weight) of trisodium phosphate, the pH of the solution is raised to approximately 10.7. Or, if the same proportion by weight of soda ash is employed in place of the trisodium phosphate, the pH of the resultant solution is raised to approximately 10.1. Again, if the solution contains only 3.33 per cent trisodium phosphate, its pH is approximately 7; while if made up to contain but 3.33% of soda ash, the pH is approximately 9.37. By employing such concentrated solutions of hexametaphosphate and alkaline addition agent of accurately known composition, in conjunction with the naturally hard water employed for diluting the concentrated emulsions to the final relatively low working concentrations, the preparation of the final emulsion baths is greatly expedited and the desired concentration and pH of those final operating emulsion baths can be arrived at with great accuracy.

Actual practice of the invention has proven remarkably successful and has enabled fruit packers to get highly satisfactory results both in the waxing of oranges and also in coloring them, by treatment with emulsions of the general character described, notwithstanding extreme hardness of the available water supply; whereas previously, under otherwise identical conditions, it had been possible to get only mediocre results and then only at excessive cost because of the necessity of frequently dumping the emulsion baths and replacing them by fresh emulsions.

Thus, in one instance where a wax emulsion of the dry-bright type was being used, the emulsion practically always broke down completely during the second day of its use, before the process of the present invention was introduced, and a fresh emulsion had to be susbtituted. After introduction of the present process, this trouble entirely disappeared and the emulsion was used for four weeks. It was dumped at the end of that time, although still stable, only because of the accumulation of dirt and trash in the bath which rendered advisable its replacement by fresh emulsion rather than going to the trouble and expense of centrifuging or otherwise freeing it of accumulated foreign matter. During this time the performance of the emulsion bath in providing the fruit with a satisfactory wax coating or film was found actually to improve; one reason for this improvement evidently being the substantial decrease in surface tension which is found to occur in emulsions prepared in accordance with the invention, after they have been in use for a time.

So also, in this same instance, introduction of sodium hexametaphosphate into a dye emulsion bath of the prior art type, with which the oranges were treated prior to undergoing the waxing treatment but which had been giving much trouble and producing rather unsatisfactory results, brought about very marked improvement. The coloring or dyeing action was not only much more uniform than before, but the color shade obtained was noticeably clearer and more attractive, and a notable saving was also effected in the amount of dyestuff used.

In a typical instance, an emulsion of waxy material at approximately 4% concentration, prepared in accordance with the invention, may have initially a surface tension of 37 dynes per centimer, measured under standard conditions at 20° C., and may show a decrease to 30 dynes after two weeks.

The term "emulsion" as herein employed is to be understood in a broad sense as including not only emulsions to which the name is applied in a strict scientific or theoretical sense, but also more generally, liquid preparations sometimes otherwise referred to as colloidal solutions or suspensions. In other words, the term signifies liquid compositions of the general character hereinabove referred to and generally designated as emulsions, in a more or less non-technical sense, by those skilled in this art. With respect to the wax-containing emulsions and use of the same for protectively coating fruits and vegetables, the term "fruit" or "fruits" as herein employed is to be construed, unless otherwise indicated, as including both fruit and vegetables.

What is claimed is:

1. The process of protectively treating fresh fruit with a soap-containing emulsion of waxy material, while employing a naturally hard water in the emulsion bath, which comprises applying to fresh fruit such an aqueous emulsion bath containing dissolved therein a sufficient proportion of sodium hexametaphosphate to prevent precipitation of insoluble soap.

2. The process of protectively treating fresh fruit with a soap-containing emulsion of waxy material, while employing a naturally hard water in the emulsion bath, which comprises applying to fresh fruit such an aqueous emulsion bath containing dissolved therein a sufficient proportion of sodium hexametaphosphate to prevent precipitation of insoluble soap, and buffered to a pH within the range 7.0 to about 9.0.

3. The process of enhancing the natural color of whole fresh citrus fruit, by application thereto of an aqueous emulsion of a suitable oil-soluble dye emulsified with a soap, while employing naturally hard water in the dye bath, which comprises subjecting fresh fruit to the action of such a bath containing dissolved therein a sufficient proportion of sodium hexametaphosphate to prevent precipitation of insoluble soap.

4. The process of enhancing the natural color of whole fresh citrus fruit, by application thereto of an aqueous emulsion of a suitable oil-soluble dye emulsified with a soap, while employing naturally hard water in the dye bath, which comprises subjecting fresh fruit to the action of such a bath containing dissolved therein a sufficient proportion of sodium hexametaphosphate to prevent precipitation of insoluble soap, and buffered to a pH within the range of 7.0 to about 9.0

5. An aqueous emulsion useful for treating fresh fruit for market, comprising a water-insoluble but oil-compatible material adapted to enhance the marketability of the fruit when deposited on the surface thereof, emulsified by means of a soap with a relatively large proportion of water containing hardening components and a sufficient proportion of a water-soluble hexametaphosphate to prevent precipitation of insoluble soaps of said hardening components.

6. An aqueous emulsion useful for treating fresh fruit, comprising waxy material emulsified by means of a soap with a relatively large proportion of water containing hardening components and a sufficient proportion of a water-soluble hexametaphosphate to prevent precipitation of insoluble soaps of said hardening components.

7. An aqueous emulsion useful for treating fresh fruit, comprising waxy material emulsified by means of a soap with a relatively large proportion of water containing hardening components and a sufficient proportion of a water-soluble hexametaphosphate to prevent precipitaponents, and buffered to a pH within the range 7.0 to about 9.0.

8. An aqueous emulsion useful for treating fresh fruit, comprising a suitable oil-soluble dye emulsified by means of a soap with a relatively large proportion of water containing hardening components and a sufficient proportion of a water-soluble hexametaphosphate to prevent precipitation of insoluble soaps of said hardening components.

9. An aqueous emulsion useful for treating fresh fruit, comprising a suitable oil-soluble dye emulsified by means of a soap with a relatively large proportion of water containing hardening components and a sufficient proportion of a water-soluble hexametaphosphate to prevent precipitation of insoluble soaps of said hardening components, and buffered to a pH within the range 7.0 to about 9.0.

10. In the preparation of fresh fruit for market, the process of providing such fruit with a permanent surface deposit of water-insoluble but oil-compatible material adapted to enhance marketability of the fruit, which comprises applying to such fruit a soap-containing emulsion of said material in a naturally hard water, said emulsion containing a sufficient proportion of a water-soluble hexametaphosphate to substantially prevent precipitation of insoluble soap.

11. In the preparation of fresh fruit for market, the process of providing such fruit with a permanent surface deposit of water-insoluble but oil-compatible material adapted to enhance marketability of the fruit, which comprises applying to such fruit a soap-containing emulsion of said material in a naturally hard water, said emulsion containing a sufficient proportion of an alkali-metal hexametaphosphate dissolved therein to prevent precipitation of insoluble soap and being buffered to a pH within the range of 7.0 to about 9.0.

12. In the preparation of fresh fruit for market, the process of providing such fruit with a protective coating of waxy material to reduce withering and shrinkage, which comprises applying to such fruit a soap-containing emulsion of waxy material in a naturally hard water, said emulsion containing sodium hexametaphosphate in the proportion of from about 0.5 to 2.5 pounds per fifty gallons of emulsion.

13. The process defined by claim 12, wherein said emulsion is buffered by means of an added basic salt to a pH within the range of 7.0 to about 9.0.

14. An aqueous emulsion useful for protectively treating fresh fruit against withering and shrinkage, comprising waxy material emulsified by means of a soap with a relatively large proportion of water containing hardening components, together with sodium hexametaphosphate in the proportion of from about 0.5 to 2.5 pounds per fifty gallons of the emulsion.

15. In the preparation of citrus fruit for market, the process of enhancing its natural color which comprises applying to such fruit a soap-containing emulsion of a suitable oil-soluble dye in a naturally hard water, said emulsion containing sodium hexametaphosphate dissolved therein in proportion within the range of about 0.5 to 2.5 pounds per fifty gallons of the emulsion.

16. The process defined in claim 15, wherein said emulsion is buffered by means of an added basic salt to a pH within the range of 7.0 to about 9.0.

17. An aqueous emulsion useful for enhancing the natural color of fresh citrus fruit, comprising a suitable oil-soluble dye emulsified by means of a soap with a relatively large proportion of naturally hard water, said emulsion containing sodium hexametaphosphate in proportion within the range of from about 0.5 to 2.5 pounds per fifty gallons of emulsion.

IRVIN JOHN BLONDON.